W. V. TURNER.
FLUID COMPRESSOR.
APPLICATION FILED AUG. 6, 1912.
1,096,871.
Patented May 19, 1914.
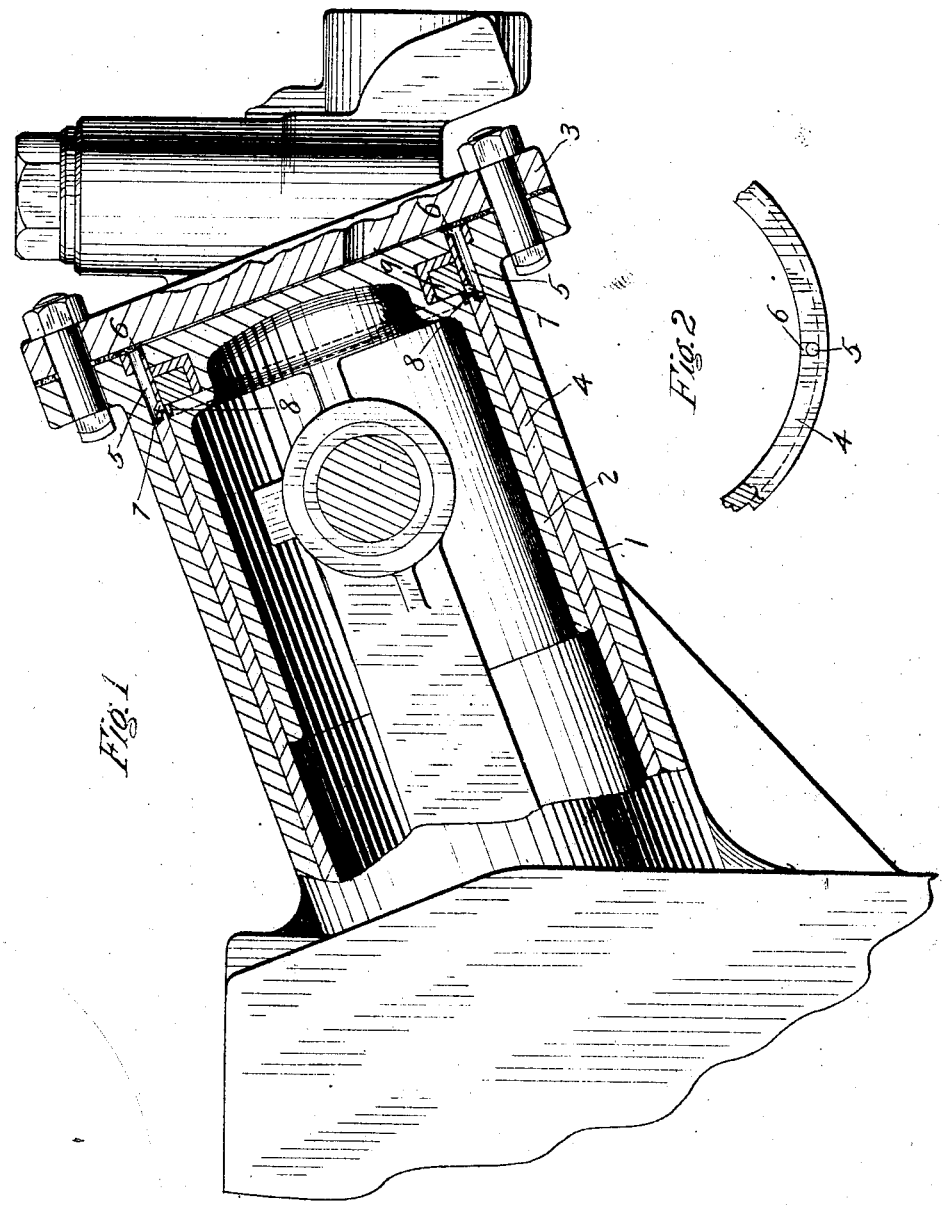

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-COMPRESSOR.

1,096,871.

Specification of Letters Patent.

Patented May 19, 1914.

Application filed August 6, 1912. Serial No. 713,541.

*To all whom it may concern:*

Be it known that I, WALTER V. TURNER, a citizen of the United States, residing at Edgewood, in the county of Allegheny and State of Pennsylvania, have invented new and useful Improvements in Fluid-Compressors, of which the following is a specification.

This invention relates to fluid compressors, and more particularly to the fluid compressing cylinder portion.

It has been found that lubricating oil employed in oiling the bearing parts of the compressor works into the fluid compressing cylinder from the crank case chamber and that the reciprocating movement of the compressor piston in the cylinder causes the formation of a layer of oil on the cylinder wall which upon the outward stroke of the piston is carried forward by the piston so that quite a ring of oil is often present on the fluid side of the piston at the end of its stroke. This oil is then forced out to a considerable extent with the compressed fluid. Considerable oil is thus wasted, and the oil in the compressed air is furthermore liable to interfere with the proper working of such valve mechanisms as are employed, for example, in connection with fluid pressure brakes.

The principal object of my invention is to provide means for preventing oil collected by the compressor piston from passing out with the compressed fluid.

In the accompanying drawing, Figure 1 is a sectional view of the air cylinder portion of a fluid compressor showing my improvement applied thereto and Fig. 2 an end view of a fragment of the air cylinder bushing.

As shown in Fig. 1 of the drawing my improvement is applied to a fluid compressor of one of the usual types comprising a cylinder 1, an air compressor piston 2 mounted therein, and cylinder head 3 carrying the usual inlet and outlet air valves.

In the piston bushing 4 at the outer end are drilled one or more longitudinal holes 5 having inwardly extending radial grooves 6 at the extreme outer edge and ports 7 leading from the inner end of the holes 5 to the interior bearing face of the bushing 4. Adjacent to the inner face of the piston ring 9 an annular groove 8 is cut in the piston 2 and this groove is so located as to register with the ports 7 when the piston is in its extreme outer position.

In operation, the oil carried forward by the outward movement of the compressor piston is forced into the holes 5 and thence passes through the ports 7 to the annular groove 8. The oil is thus conducted to the inner side of the piston rings and can then work back between the exterior surface of the piston 2 and the bearing surface of bushing 4 to the crank case chamber. It will thus be seen that the oil entrained in front of the piston 2 is carried back to the crank case chamber and is consequently prevented from passing along with the fluid compressed by the pump. It will also be noted that this return movement of the oil is aided by the air pressure existing at the outer face of the piston.

Having now described my invention, what I claim as new and desire to secure by Letters Patent, is:—

1. In a fluid compressor, the combination with a compressor cylinder and a piston therein, of means for returning oil entrained by the piston to the crank case side of the piston to thereby prevent the oil from passing out with the compressed air.

2. In a fluid compressor, the combination with a compressor cylinder and a piston therein having the usual piston rings, of ports adapted to establish communication from the face of the piston around the piston rings upon movement of the piston to its outer position, to thereby provide means of escape for the oil entrained by the piston.

3. In a fluid compressor, the combination with a compressor cylinder, a piston therein having the usual piston rings, and a bushing between the cylinder and piston, of ports in said bushing for establishing communication from the air compressing face of the piston to the inner side of the piston rings upon movement of the piston to its outer position, to thereby permit the escape of oil entrained by the piston.

4. In a fluid compressor, the combination with a compressor cylinder, a piston therein having the usual piston rings, and a bushing between the cylinder and piston, of an annular groove in said piston at the inner side of the piston rings and ports in said bushing adapted to establish communication from the chamber at the outer face of the piston to said groove upon movement of the piston to its outer position, to thereby permit oil entrained by the movement of the piston to escape.

In testimony whereof I have hereunto set my hand.

WALTER V. TURNER.

Witnesses:
 A. M. CLEMENTS,
 S. W. KEEFER.